Jan. 5, 1971  S. KOTOČ  3,552,231

CONNECTING ROD

Filed July 24, 1968

INVENTOR
Štefan Kotoč

United States Patent Office 3,552,231
Patented Jan. 5, 1971

3,552,231
CONNECTING ROD
Štefan Kotoč, Prague, Czechoslovakia, assignor to Ustav pro vyzkum motorovych vozidel, Prague, Czechoslovakia
Filed July 24, 1968, Ser. No. 747,228
Claims priority, application Czechoslovakia, July 27, 1967, 5,499/67
Int. Cl. F16c 7/00
U.S. Cl. 74—579
6 Claims

ABSTRACT OF THE DISCLOSURE

A connecting rod adapted to interconnect the crankshaft and piston of an engine. The rod has a pair of opposed ends, one of which is connected to a wrist pin secured in the piston and swingable about the axis thereof, the other end of which is connected to a crankpin secured to the crank and swingable about the axis thereof. The connecting rod is continuously curved along its entire length and has a center line which intersects these axes.

BACKGROUND OF THE INVENTION

The present invention relates to connecting rods for engines.

As is well known, one of the serious problems encountered with connecting rods is the fact that they are subjected to undesirably intense shocks and vibrations.

This problem is acute in conventional connecting rods of substantially straight and rigid construction which while they resist buckling, transmit undesirable vibrations and shocks between the wrist pin of the piston and the crankshaft bearing. These vibrations result primarily from reciprocation of the connecting rod induced by the rotary movement of the crankshaft, with the inherent sudden reversal in the direction of movement of the connecting rod when the piston reaches its opposed dead center position. Additional vibrations and shocks are derived from the sudden thrust acting on the piston upon combustion in the cylinder.

Partial damping of these shocks and vibrations is achieved by providing the wrist pin a degree of clearance which is filled with a layer of lubricant. However, the cushion effect achieved by the lubricant does not provide a desired amount of damping. On the other hand, no damping whatsoever is attempted about the crankshaft bearing so that at this location there is a particularly undesirable production of shock and vibration as well as noise in the running of the engine.

SUMMARY OF THE INVENTION

It is accordingly a primary object of the present invention to provide a connecting rod which will avoid the above mentioned drawbacks.

In particular, it is an object of the invention to provide a connecting rod which will to a very large extent damp both shocks and vibrations resulting from the harmonic oscillations derived from the crank mechanism during operation of the engine.

A further object of the invention is to provide a connecting rod structure which is relatively simple and can be used with conventional crankshafts and pistons, so that in this way the connecting rod of this invention can be used with engine assemblies which otherwise are completely conventional.

Furthermore, it is an object of my present invention to provide a connecting rod structure which can greatly reduce the drawbacks of conventional connecting rods, while at same time enhancing the efficiency with which the engines operate.

In accordance with the invention, the connecting rod has a pair of opposed ends one of which carries a means for connecting the rod to a wrist pin for swinging movement relative thereto about a given axis, while the other end of the connecting rod carries a means for connecting the rod to a crankpin for swinging movement relative thereto about a second axis which is parallel to the wrist pin axis. The connecting rod of the invention is continuously curved along its entire length and has a curved center line which extends between and intersects the wrist pin axis and the crankpin axis.

There are known connecting rods which have center lines that are not straight. Such connecting rods have along at least part of their length a center line which is of an angular configuration, and are designed for special engines to reduce the dimensions thereof and for similar purposes. Connecting rods of the latter type do not damp shocks and vibrations.

On the other hand, the connecting rod according to the present invention if employed with rigid shape and materials will experience deflections and additional friction at its bearings, which will provide the connecting rod with the action of a relatively rigid spring for damping vibrations or oscillations of higher frequencies. If relatively resilient material or shape is employed the vibrations or oscillations of lower frequencies, are accompanied by a lesser degree of acceleration and smaller mass forces, so that even the latter are more tolerable. The curved construction of the connecting rod transfers perfectly the reciprocation of the piston to the crankshaft so as to rotate the latter.

Inasmuch as the curved connecting rod of the invention acts as a resilient member between the crankshaft and piston, it moderates the undesirable effects of detonations and combustion shocks which occur during the operation of the engine.

The connecting rod of the present invention when maintained at substantially the same dimensions and cross sections as conventional rods exhibits no loss of tensile strength resulting from its curved form and is no less likely to break in case of a partial or complete jamming or stopping of the piston movement. Also, the bending strength of the curved connecting rod of the invention, with respect to the moment of forces of its own inertia, is no less than that encountered with conventional connecting rods of engines of the same size, so that the use of the connecting rod of the invention does not require any increase in the weight and dimensions of the connecting rod as compared to conventional connecting rods.

BRIEF DESCRIPTION OF THE DRAWING

The invention is illustrated, by way of example, in the accompanying drawing which forms part of this application and in which.

DESCRIPTION OF A PREFERRED EMBODIMENT

Figure 1:
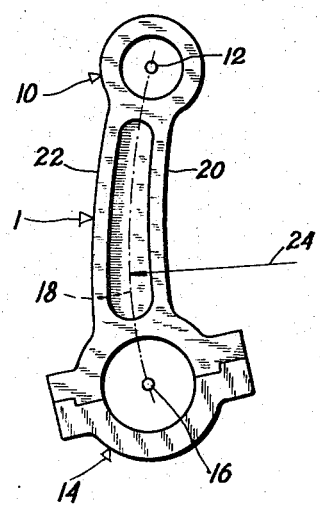
FIG. 1 is a schematic side elevation of a connecting rod of the present invention.

Referring to the drawing in greater detail now, and initially to FIG. 1, the connecting rod 1 has a pair of opposed ends. At one of these ends the connecting rod 1 carries a means 10 for swingably connecting the rod 1 to a wrist pin of a piston 2. The piston 2 swings relative to the axis 12 of the wrist pin and is journaled in a known way in the means 10. At its opposed end, the connecting rod 1 carries means 14 for swingably connecting the opposed end to a crank pin 28 of a rotary crankshaft 3, the crankpin having an axis 16 with respect to which the connecting rod 1 is also swingable. The crankpin is journaled in the means 14. The axes 12 and 16 are parallel to each other in conventional manner.

In accordance with the invention, the connecting rod has the curved configuration illustrated in FIG. 1. The center line 18 of the connecting rod extends between and intersects the parallel axes 12 and 16.

The connecting rod has a pair of opposed exterior longitudinal side surfaces 20 and 22 which are concave and convex, respectively. It will be noted that the curvature 24 of the center line 18 is sufficiently greater so that a straight line drawn between and intersecting the axes 12 and 16, is situated between the center line 18 and the concave side surface 20 of the connecting rod.

Figure 2:
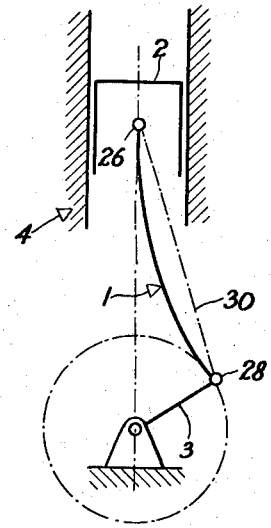
FIG. 2 is a schematic illustration of the manner in which the connecting rod of the invention coacts with a piston and crankshaft.

Referring to FIG. 2, the curved connecting rod 1 of the invention is schematically illustrated in its position of use as being swingably connected to the wrist pin 26 of a piston 2 which reciprocates in a cylinder 4 of an engine, while the lower end of the rod 1, as viewed in FIG. 2, is shown to be swingably connected to the crankpin 28 of a rotary crankshaft 3.

It is to be noted that in accordance with a further feature of the invention the curvature 24 of the center line 18 is not of a constant magnitude. Thus, referring to FIG. 2, it will be seen that a tangent to the curved center line 18 at the point where it intersects the axis 12 forms with the straight line 30 interconnecting the axes 12 and 16 an angle which is smaller than the angle formed between the straight line 30 and the tangent to the center line 18 at the point where it intersects the axis 16 of the crankpin 28. In the particular position of the parts shown in FIG. 2, the straight line which is perpendicular to and intersects the axis 12 of the wrist pin 26 and the axis of the rotation of the crankshaft 3 substantially coincides with the tangent to the curved center line 18 at the point where it intersects the axis 12.

While it is indeed possible to provide variations in one or the other of the above features, it has been found that a connecting rod having all of the details referred to hereinbefore is preferred and operates most desirably to achieve damping of shocks and vibrations due to the springy characteristics imparted to the connecting rod as a result of the curvature thereof, while at the same time the size of the connecting rod need not be made any greater than that of a conventional connecting rod. The connecting rod of the invention can still transmit the same load and withstand the same stresses as a conventional straight connecting rod.

I claim:
1. For use in an engine, an elongated connecting rod having a pair of opposed ends, carrying at one of said ends means for swingably connecting said rod to a wrist pin directly secured in a piston for swingable movement with respect thereto about the axis of the wrist pin, and carrying at the other of said ends means for swingably connecting said rod to a crankpin for swingable movement relative thereto about a second axis parallel to said given axis, said connecting rod being continuously curved along its entire length and having a center line extending between and intersecting said axes.

2. The connecting rod of claim 1 and wherein said rod has a pair of opposed exterior longitudinal side surfaces directed away from said center line and respectively having a concave and a convex curvature.

3. The connecting rod of claim 2 and wherein a straight line extending between and intersecting said axes and situated in a plane normal to said axes and containing said center line is situated between said center line and said concave side surface.

4. The connecting rod of claim 1 and wherein a tangent to said curved center line at the point where it intersects said wrist pin axis and a tangent to said center line at the point where it intersects said second axis form with a straight line extending between and intersecting said axes a pair of angles of different magnitudes.

5. The connecting rod of claim 4 and wherein the angle between said straight line and the tangent to said curved center line where it intersects said second axis is greater than the other of said angles.

6. The connecting rod of claim 5 and wherein said rod has a pair of outer longitudinal side surfaces one of which is concave and the other of which is convex, said straight line which extends between and intersects said axes being situated between said center line and said concave side surface.

References Cited

UNITED STATES PATENTS

| Re. 18,097 | 6/1931 | Coyne | 74—579E |
| 1,786,934 | 12/1930 | Briggs | 74—579E |
| 1,807,382 | 5/1931 | Butler | 74—579E |
| 1,838,256 | 12/1931 | Harris | 74—579E |
| 3,286,535 | 11/1966 | Schrader | 74—579E |

FOREIGN PATENTS

| 494,270 | 3/1930 | Germany | 74—579 |

FRED C. MATTERN, Jr., Primary Examiner

F. D. SHOEMAKER, Assistant Examiner